US007307744B2

(12) United States Patent
Hikawa (10) Patent No.: US 7,307,744 B2
(45) Date of Patent: Dec. 11, 2007

(54) IMAGE PROCESSING DEVICE THAT CONTROLS A PRINTING PROCESS BASED ON AVAILABILITY OF A CONSUMABLE RESOURCE

(75) Inventor: Yuji Hikawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 720 days.

(21) Appl. No.: 10/274,103

(22) Filed: Oct. 21, 2002

(65) Prior Publication Data

US 2003/0076525 A1   Apr. 24, 2003

(30) Foreign Application Priority Data

Oct. 23, 2001   (JP)   ............................. 2001-325046

(51) Int. Cl.
  *G06F 3/12*   (2006.01)
  *G06F 11/30*   (2006.01)
  *G03G 15/00*   (2006.01)

(52) U.S. Cl. .................. 358/1.14; 358/1.13; 358/1.15; 399/24; 399/82; 710/16

(58) Field of Classification Search ............... 358/1.14, 358/1.15, 1.16, 1.13; 710/15, 16; 399/24, 399/87, 389, 82; 347/106

See application file for complete search history.

(56) References Cited

U.S. PATENT DOCUMENTS

| | | | | |
|---|---|---|---|---|
| 5,206,735 A | * | 4/1993 | Gauronski et al. .......... | 358/296 |
| 5,812,907 A | * | 9/1998 | Itoh et al. ...................... | 399/87 |
| 5,847,857 A | * | 12/1998 | Yajima et al. ............... | 358/468 |
| 5,970,224 A | * | 10/1999 | Salgado et al. ............. | 358/1.16 |
| 6,058,249 A | * | 5/2000 | Matsuda et al. ............ | 358/1.14 |
| 6,219,502 B1 | * | 4/2001 | Osari et al. ................... | 399/82 |
| 6,285,843 B1 | * | 9/2001 | Obata .......................... | 399/82 |
| 6,466,748 B2 | * | 10/2002 | Tamai et al. .................. | 399/16 |
| 6,678,065 B1 | * | 1/2004 | Hikawa ...................... | 358/1.13 |

FOREIGN PATENT DOCUMENTS

| | | | |
|---|---|---|---|
| JP | A 10-164284 | | 6/1998 |
| JP | 2001-26169 A | | 1/2001 |
| JP | 2001026169 A | * | 1/2001 |

\* cited by examiner

*Primary Examiner*—Kimberly Williams
*Assistant Examiner*—Charlotte M. Baker
(74) *Attorney, Agent, or Firm*—Oliff & Berridge, PLC (57) ABSTRACT

An image-processing device creates a sequential print-processing schedule for inputted print jobs on the basis of supply conditions of required resources, such as printing media and the like, and of attribute information of the print jobs. Before execution of a print job, the image-processing device acquires attribute information for the leading job in a print-waiting queue, and determines whether or not resources requested for that print job are supplied. If not, execution of that printing job is inhibited, and the next print job in line is performed. Thus, productivity of the device can be improved. However, it is also determined whether or not the print job meets a predetermined condition. If so, other jobs are blocked from overtaking the inhibited job and being performed first. The inhibited job waits until resources are supplied, and thus re-prioritization of the print jobs against the will of a user is prevented.

8 Claims, 6 Drawing Sheets

| ITEM | VALUE |
|---|---|
| JOB IDENTIFIER | 0x00000002 |
| JOB TYPE | COPY |
| JOB PRIORITY | HIGH |
| NUMBER OF PAGES | 6 |
| PAPER SIZE | A4 |
| NUMBER OF SHEETS | 6 |
| PAPER TYPE | STANDARD PAPER |
| PAPER COLOR | STANDARD (WHITE) |
| PAPER ORIENTATION | AUTO |
| PAPER TRAY | AUTO |
| PRINTING SETTINGS | 1-UP/SINGLE-SIDED |
| JOB STATUS | WAITING FOR SUPPLIES |

IMAGE PROCESSING DEVICE THAT CONTROLS A PRINTING PROCESS BASED ON AVAILABILITY OF A CONSUMABLE RESOURCE

BACKGROUND OF THE INVENTION

1. Field of the Invention

The present invention relates to an image-processing device, and more particularly to an image-processing device which controls printing processing for carrying out image formation in a copying function, a facsimile function, a printing function and the like.

2. Description of the Related Art

Multifunction devices combine a plurality of functions in a single device, such as a copying function, a scanning function, a printing function and a facsimile function. These multifunction devices are provided with pluralities of input means for inputting images, such as scanners for scanning originals, telephone connections for receiving facsimiles, and networks such as LANs (Local Area Networks) for receiving print data. Moreover, the devices include therewith pluralities of output means, such as printing means for printing onto paper, telephone connections for transmitting facsimiles, and networks such as LANs or the like for transmitting various inputted images to a host computer or the like. Furthermore, these devices may be provided with storage means such as hard disks and the like for providing various functions such as temporarily accumulating and storing inputted image data.

In such a multifunction device, various image input jobs can be provided to a user by combination thereof with any one of the plurality of output devices. A great variety of functions can be provided such as, for example, a copying function achieved by outputting at the printing means image data read from a scanner, a printing function achieved by outputting at the printing means decoded PDL (Page Description Language) data or the like that has been received across a network, a facsimile function which uses a telephone connection or the like to transmit an image read from a scanner as a facsimile, and the like.

Accordingly, because the likelihood of temporarily collecting a plurality of printouts for the copying function, printouts for the printing function, printouts of received facsimiles and the like is increased in such a multifunction device, there are cases in which printing processes that are in a print-waiting condition become numerous. In such a case, printout requests for all of the functions are administered as printing jobs, a job controlling means is prepared for sequentially administering the plurality of jobs in a print-waiting queue or the like, and processing is effected to perform sequential control of the plurality of print jobs.

In a situation in which such a plurality of jobs is in the print-waiting condition, there may be a case in which paper that is necessary for a specific printing job, for which a printing process has commenced execution, is not present in a paper tray of the printing means. As long as the paper that is necessary for that job is not supplied to the printing means, processing for that job and a set of subsequent print jobs is halted. For example, in a situation in which only A4 size paper is fed from a paper tray, a case which corresponds to this situation is a case in which a printing job for which printing commencement is desired requires paper of size A3. At this time, the job that requires A3 is put into a processing-waiting condition while waiting for paper supply, and thus a condition occurs wherein, even though printing commencement could be possible, processing cannot commence. When this happens, the printing job that was submitted by the specific user cannot be commenced, and a plurality of printing jobs that have been submitted by other users, and which could be executed immediately, are stuck in the print-waiting condition. Hence, there are problems in that productivity of the whole device is reduced and the device's usefulness to users deteriorates.

Accordingly, for a technique disclosed in, for example, Japanese Patent Application Laid-Open (JP-A) No. 10-164284, an image-forming device has been proposed which, in a case in which a print job cannot be executed in accordance with predetermined execution instructions due to a lack of paper or the like, suspends printing processing for that job and commences execution of a print job that was scheduled to be executed subsequent to that job. Accordingly, printing processing can be performed efficiently.

However, in the technique disclosed in JP-A 10-164284, in a case in which a paper shortage or the like occurs in the middle of a printing process, because the printing process is then suspended and printing of another job is commenced, printed results of the suspended job and printed results of the subsequent job may be mixed up. Moreover, in the technique disclosed in JP-A 10-164284, in a case in which execution of a single job mixes printing processing on different sizes of paper, the printing processing is executed even if one of the desired paper sizes is not present in the paper trays. When execution of the printing process is attempted for the desired paper size that is not in the printing trays, the printing processing is suspended and printing is carried out for a subsequent job. Consequently, in the same way as described above, printing output for the suspended job and the subsequent job may be mixed up.

Further, in the case of a job for which a user carries out control at the location of an image-forming device, for operating a copying function or the like, if a shortage of paper or the like occurs during the job, the printing processing for that job is suspended and a subsequent job is commenced. Thus, the user must wait for the subsequent job to complete its output, and then the user must wait for the user's copy job to recommence printing. Moreover, in such a case, there is a possibility that another job may commence during a preparation time while the user is working to supply the paper required for the job that the user requested, the other job thereby jumping ahead of the user's job. Furthermore, if the job that jumps ahead has a large number of pages to be printed, the user may have to wait for a long time until the user can obtain the results of the user's printing process. Thus, there is a problem in that the device's usefulness is deteriorated.

Yet further, in a case in which a user requests printing of an image by a printing function from, for example, a personal computer connected to an image-forming device on a network or the like, the printing request may be implemented with a raised priority level such that that job is printed preferentially. However, even in such a case, if paper of a necessary size is not present in a paper tray, there is a possibility that that printing process may be jumped ahead of in the queue. There is a high likelihood that the job whose execution request has a higher priority level is highly urgent for that user, but if that job is jumped ahead of by other jobs, then there is a problem in that the waiting time becomes long.

SUMMARY OF THE INVENTION

The present invention is provided to solve the problems described above, and an object of the present invention is to provide an image-processing device which is capable of both improving productivity of the device and improving usefulness to users.

One aspect of the present invention for achieving this object is provided by an image-processing device provided with a resource required for printing processing, the device being for executing printing processing to print images using the resource, the device including: inputting means for inputting a print job including image data to the image-processing device; acquiring means for acquiring resource information including presence or absence of the resource required for printing processing; printing means for executing printing processing in accordance with the image data; and controlling means for controlling the execution of printing by the printing means, wherein, before commencement of the printing processing, the controlling means identifies whether the resource for printing the image data is present on the basis of the print job and the acquired resource information, and if the controlling means determines that the required resource is not accommodated, then the controlling means inhibits the printing processing.

This image-forming device further includes storing means for storing the required resource, and the acquiring means includes detecting means for detecting whether or not the resource is stored at the storing means. If a resource that will be required for the print job during execution of the printing processing will be absent, then the controlling means inhibits the printing processing. Also, in a case in which the controlling means has inhibited the printing processing and another print job, which is executable, is inputted, the controlling means controls so as to prioritize printing processing of the other print job over the inhibited print job, that is to take precedence over the inhibited print job, and to execute printing processing of the other print job. Furthermore, for a print job which meets a predetermined condition, the controlling means inhibits execution of printing processing that has been prioritized (given precedence) thereover, even when another printing job, which is executable, has been inputted.

In the aspect of the present invention described above, print data, which includes image data for executing printing processing so as to print images on a printing medium, is inputted by the inputting means. For example, the inputting means may input print jobs which include image data transmitted from an external personal computer and print jobs which include image data transmitted from image-reading means which reads an image of an original, or the like.

At the storing means, resources such as, for example, a printing medium such as paper or the like, toner for printing the image on the printing medium, and the like are stored. Storage information, including the presence/absence of these resources stored in the storing means, is detected by the detecting means and acquired. Apart from the presence/absence of the resources, the storage information detected by the detecting means may include, for example: for a printing medium such as paper or the like, a size, a printing medium color, an orientation (paper feeding direction/printing direction) in which the printing medium is prepared in a printing tray, and the like; and for toner or the like, colors and the like are detected.

The printing means is controlled by the controlling means, and printing processing is carried out in accordance with image data that is inputted by the inputting means. That is, images are printed on the printing medium at the printing means.

At this time, if, on the basis of the print job inputted by the inputting means and resource information from the acquiring means (that is, detection results from the detecting means), resources for printing the image data inputted by the inputting means are understood not to be stored, the controlling means blocks the printing process before the printing process is carried out by the printing means. That is, another printing process may be given precedence (prioritized).

Further, if the controlling means determines that resources for printing image data are scarce and run short during printing processing, then that printing processing is suspended. In such a case, prioritizing of another printing process and mixing up of printed results of the suspended printing process and the next printing process can be prevented.

That is, the controlling means judges whether or not the printing process is possible before executing the printing process. Thus, the controlling means controls so as to execute prioritization processing for the printing means. Hence, if a certain printing job cannot be processed for printing without resources being stored at the storing means, another printing process can be executed. In this way, cases in which all other printing processes cannot be carried out due to a single resource not being supplied are eliminated. Both productivity of the whole device and usefulness thereof to users can be improved.

Moreover, when a printing process is suspended because resources for printing the image data have been scarce and have run short during printing processing, mixing up of printed results of the suspended printing process and printed results of a next printing process can be prevented by deciding not to give precedence to another printing process at this time.

Still further, when a printing process which uses different sizes of printing medium in a single printing process is to be carried out, a storage situation of resources, such as the presence or absence of the required sizes of printing medium, is checked in advance. Thereafter, the printing process can be commenced. A case can be prevented, in which case when requested resources such as the printing medium and the like are not present, the printing process is suspended, then, a subsequent printing process is carried out, mixing up of printed printing mediums of the suspended printing process and the subsequent printing process.

Further, the controlling means inhibits prioritization processing for a print job which includes a predetermined condition. Thus, in a case in which resources corresponding to an urgent print job or the like are not stored at the storing means, a situation in which another print job is given precedence and the urgent print job has to wait for the duration of the other print job can be prevented.

The image-processing device may further include operating means. For a printing process based on a printing request from this operating means, it can be inferred that the user is in a vicinity of the device. Therefore, in such a case, prioritization of other printing processes can be inhibited. In other words, because prioritization of other printing processes is inhibited when a printing job is based on a printing request from the operating means whose user is in the device vicinity, a situation in which another printing process is prioritized even though there is a user in the device vicinity is inhibited. This operating means may be, for example, an operation panel or the like provided at the image-processing device, from which operations for requesting printing processing are possible.

Yet further, as an example of a printing process having another predetermined condition, there is a case in which memorizing means and priority level setting means are further included, and a printing process has a priority level, set by the priority level setting means, which is higher than a predetermined value or a reference value. In such a case, it can be inferred that a degree of urgency is high, and thus it may be decided to inhibit prior processing of other printing jobs. Accordingly, postponement of a printing process with a high priority can be prevented. Here, a plurality of printing jobs, which include image data for executing printing processing to print images on print media, are stored at the memorizing means. For example, print jobs for carrying out copying, print jobs obtained from facsimile transmissions, printing processes transmitted from outside, and the like are memorized. The priority level setting means may set priority levels for executing printing processes by executing software which is included at, for example, the above-mentioned operation panel, a personal computer or the like.

Furthermore, as an example of a printing process having yet another predetermined condition, there is a case in which a setting alteration of the priority level set by the priority level setting means is carried out. In such a case, it can be inferred that the degree of urgency is high, and it may be decided to inhibit prioritization and execution of other printing processes. Accordingly, a situation in which the printing process for which it is inferred that the degree of urgency is high is postponed can be prevented.

Further again, as an example of a printing process having still another predetermined condition, there is a case in which interrupting means is further included and an interrupt printing request is generated by the interrupting means. In such a case, it can be inferred that the degree of urgency is high. Thus, in such a case, prior execution of other printing processes may be inhibited by the controlling means. For example, the interrupting means may carry out an interrupt printing request by executing software included at, for example, the aforementioned operation panel, a personal computer or the like. When such an interrupt printing request is carried out, postponement of the printing process for which the degree of urgency is thought to be high can be prevented.

Moreover, as an example of a printing process having yet another predetermined condition, there is a case in which the inputting means includes image-reading means, and printing processing of a print job is based on image data read by the image-reading means. In such a case, generally, the user is likely to be in the vicinity of the device. Therefore, prior processing of other printing processes may be inhibited. For example, in a case in which image-reading means such as a scanner or the like is provided, printing by the printing means may be performed before reading by the image-reading means has been completed. Until the image-reading means has completed reading, the probability that the user is in the vicinity of the device is high. In such a case, by inhibiting prior execution of other printing processes, a situation can be prevented in which another printing process is given processing priority, even though the user is in the vicinity of the device, and the user has to wait for the duration of the other printing process.

In a case in which the image-processing device is provided with a plurality of inputting means, the controlling means may control the printing means so as to perform printing processing based on priority levels established in advance for each of the inputting means. That is, when a plurality of printing requests are generated at substantially the same time, printing processing is carried out in accordance with the pre-established priority levels of the respective inputting means, and thus a sequence can be specified for printing processing. At this time, by setting the priority levels of print requests from inputting means that are in the vicinity of the device to high levels, productivity of the whole device can be improved without negatively affecting usefulness to users.

Moreover, it is common for print jobs inputted from the inputting means to further include ancillary information relating to printing. The ancillary information may include, for example, size of a printing medium, orientation of the printing medium, color of the printing medium, material of the printing medium, information for identifying the storing means in which the printing medium is stored (an identification number or the like), and the like. The image-processing device can be structured such that determining means, which determines, on the basis of the ancillary information, whether or not resources for printing the image data inputted from the inputting means are stored, is included at the controlling means. Consequently, it can be determined whether or not resources corresponding to a print job are stored at the storing means.

DESCRIPTION OF THE PREFERRED EMBODIMENTS

Figure 1:
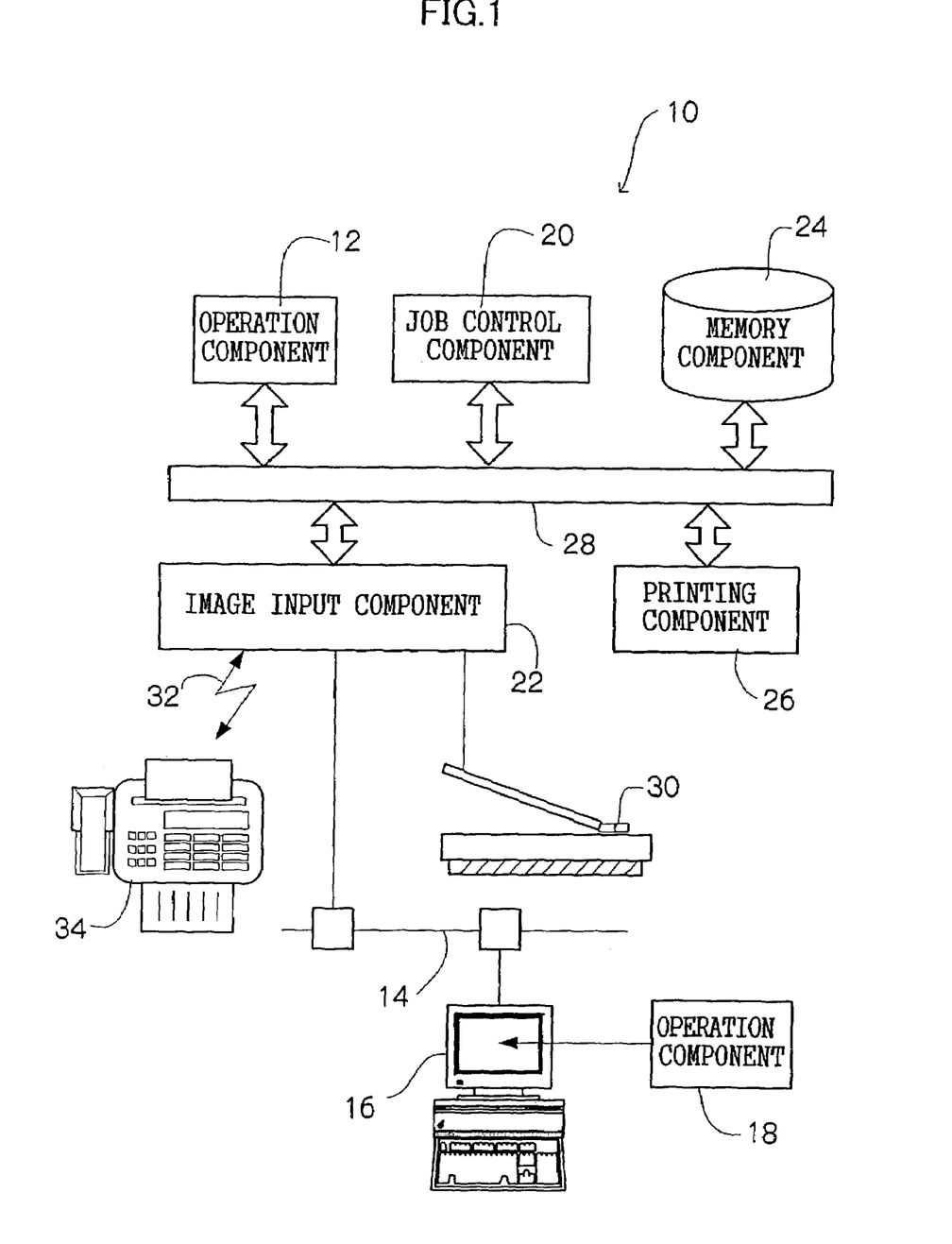
FIG. 1 is a diagram showing schematic structure of an image-processing device relating to an embodiment of the present invention.

An example of an embodiment of the present invention is explained in detail below, with reference to the drawings. FIG. 1 shows a block diagram representing basic structure of an image-processing device 10 relating to the embodiment of the present invention. As shown in FIG. 1, the image-processing device 10 relating to the embodiment of the present invention is structured with an operation component 12, an operation component 18, a job control component 20, an image input component 22, a memory component 24, a printing component 26 and a system bus 28. The operation component 12 receives operation instructions for job requests and the like from a user, and displays operation conditions and the like of the device. The operation component 18 runs on a personal computer 16 (below referred to as a "PC"), which is connected to a network 14, and remotely operates job requests and the like operated by a user from a remote location. The job control component 20 receives various image input job requests from both the operation component 12 and the operation component 18, and controls execution of a plurality of jobs. The image input component 22 performs image input processing. The memory component 24 is provided with a non-volatile memory such as a hard disk (HDD) or the like, and accumulates inputted images as image data. The printing component 26 reads the accumulated image data and performs printing processing. The system bus 28 connects these components to one another.

A scanner 30 which reads images on originals, a facsimile device 34 connected to a telephone line 32 or the like, and the like are connected to the image input component 22. The image input component 22 includes a scanner control section, a facsimile control section, a network control section, an external storage medium control section and the like. The scanner control section controls the scanner 30 to scan original images and inputs digital image data. The facsimile control section transmits and receives facsimile image data to and from another facsimile device, the network control section transmits and receives PDL data, image data files and the like to and from the personal computer 16 connected to the network 14, which is a LAN (local area network) or the like. The external storage medium control section is connected to an external storage medium such as an MD drive, a CD-R drive or the like, and reads and writes image data and the like. These sections may be incorporated at structural components of the image-processing device 10 as necessary. For example, when a copying function is to be implemented, the scanner control section may be incorporated as an image input component. Further, when a printing function is to be implemented, the network control section may be incorporated as an image input component. Yet further, when a facsimile function is to be implemented, the scanner control section and the facsimile control section may be incorporated as image input components. Moreover, any combination of these may be incorporated thus, or all of these may be incorporated.

The operation component 12 is a portion which administers a user interface, and is provided with a display screen and various operation buttons. When a user presses various of the operation buttons, the operation component 12 carries out execution requests to the image-processing device 10 for image input/output jobs, job status confirmations, device information displays for both the image input component 22 and the printing component 26, and the like. For example, in a case of functioning as a copier, a ten-key pad for designating copy magnification, number of copies and the like, a paper tray selection button, a start button for starting copying, a stop button for temporarily halting processing during execution, a clear button which initializes all specified information, an interrupt button for performing an interrupt copy job (in interrupt mode), a cancel (stop) button for forcing a job to stop during execution, and the like are provided as the operation buttons. Further, in the case of functioning as a printer or facsimile, in addition to the buttons described above, an off-line button for temporarily halting transmission/reception of image data over the network 14, a pause button which temporarily halts a job during printing for operations such as exchanging paper and the like (and which may be combined with the stop button of the copier), a manual start button for implementing manual transmission/reception of a facsimile, a ten-key pad for inputting a telephone number (which may be combined with the ten-key pad of the copier), and the like may be incorporated.

The buttons described above may also be incorporated, as necessary, at the remote operation component 18 running on the personal computer 16. In this case, differently from the operation component 12, the buttons do not all need to be structured as hardware, but can be incorporated as software buttons created in a graphical user interface of the personal computer 16. Various job instructions can be specified by operation of these software buttons, and inputted to the image-processing device 10 through the network 14.

The job control component 20 receives a plurality of various image input jobs which are requested by operation of the operation component 12 and the operation component 18. These jobs are divided between image input jobs and image output jobs (print jobs). For image input jobs, for which execution can be commenced, the control section is appropriately selected from the image input component 22 in accordance with input data. The image data inputted from the image input component 22 is temporarily accumulated at the memory component 24. Printing processing is performed by the printing component 26, which reads the image data accumulated at the memory component 24, and sequencing control or scheduling processing is implemented in order to execute a print job. At this time, it is not necessary for the print job to wait until the image data has been completely accumulated by the image input job. For example, in the case of functioning as a copier, even before the scanner control section has completed scanning of all of a plurality of original pages, execution of the print job may be commenced when scanning has been completed for one page. Consequently, the duration per page of printing processing can be made shorter, and processing efficiency of the device can be improved.

For a received job, the job control component 20 administers a lifetime (a duration from creation to deletion of the job), assigns appropriate job status values within the job's lifetime, and administers status changes thereof. For example, in the case of a printing job, the job status values are "creating", "waiting to print", "waiting for supplies", "printing", "finished", and the like. The status values are allocated as follows. While the operation component 12, operation component 18 or the like is performing a job request to the job control component 20, the status is "creating". When the job control component 20 is sending execution instructions of a specific print job to the printing component 26, and the printing component 26 is performing print processing, the status is "printing". When a job is waiting for execution of print processing because another job is "printing", the status is "waiting to print". When print processing cannot be executed because of a shortage of a resource, such as paper or the like, which is necessary for execution of the print job, the status is "waiting for supplies". For a job for which printing processing has finished, successfully or unsuccessfully, the status is "finished".

Figure 2:
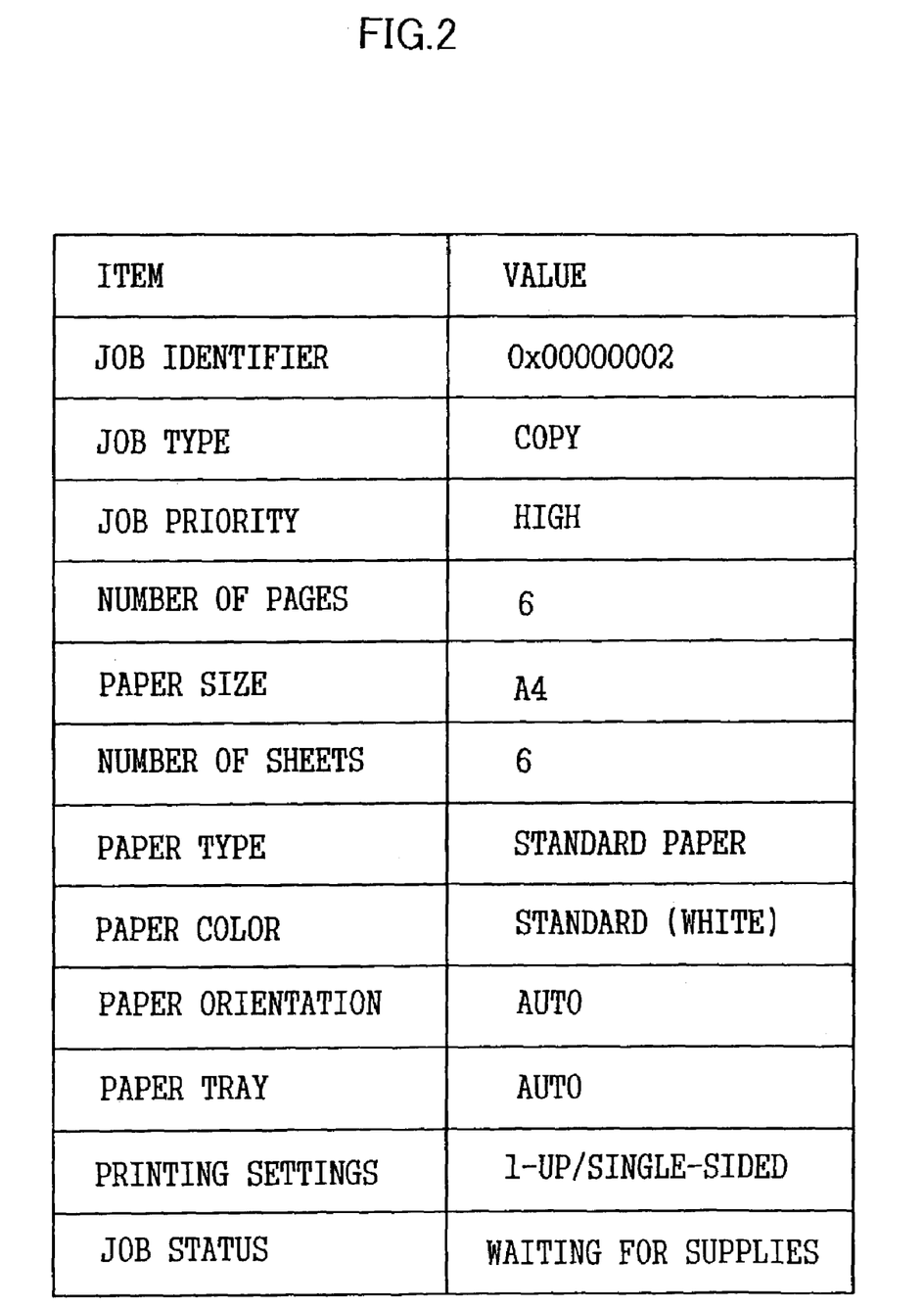
FIG. 2 is a diagram showing an example of job attribute information.

The job control component 20 administers attributes of various jobs, including the job status values, in accordance with each job. FIG. 2 shows an example of a list of job attributes which are administered by the job control component 20. Examples of information of the various attributes administered by the job control component 20 include: a "job identifier", which is a unique numerical value for identifying a requested print job; a "job type" of the print job; a "job priority" specified for the print job; "number of pages" of image data which is the object of the print job; a "paper size" of paper required for the print processing; a "number of sheets" of paper that is required; "paper type"; "paper color"; "paper orientation"; "paper tray"; "printing settings" for print processing; and a current "job status" of the job. The "job type" is set to a value which represents an image input method to be used at the image input component 22, such as copying, printing, facsimile reception or the like. The "job priority" is set to a value which represents information such as "low", "usual" or "high". If the priority is "high", print processing thereof is commenced before other printing jobs that are set to "usual". The "printing settings"

set a print processing method specified by a user, such as instructions for single- or double-sided printing, instructions for N-up printing and the like. The number of sheets of paper that is required is set after being calculated from the "printing settings" and the "number of pages". Further, the user can specify the "paper type", such as usual paper/high-quality paper/recycled paper/OHP transparencies or the like, "paper color" and the like as necessary. This example illustrates job attribute values of a printing job, but other attributes may be administered as necessary for another type of job.

Figure 3:
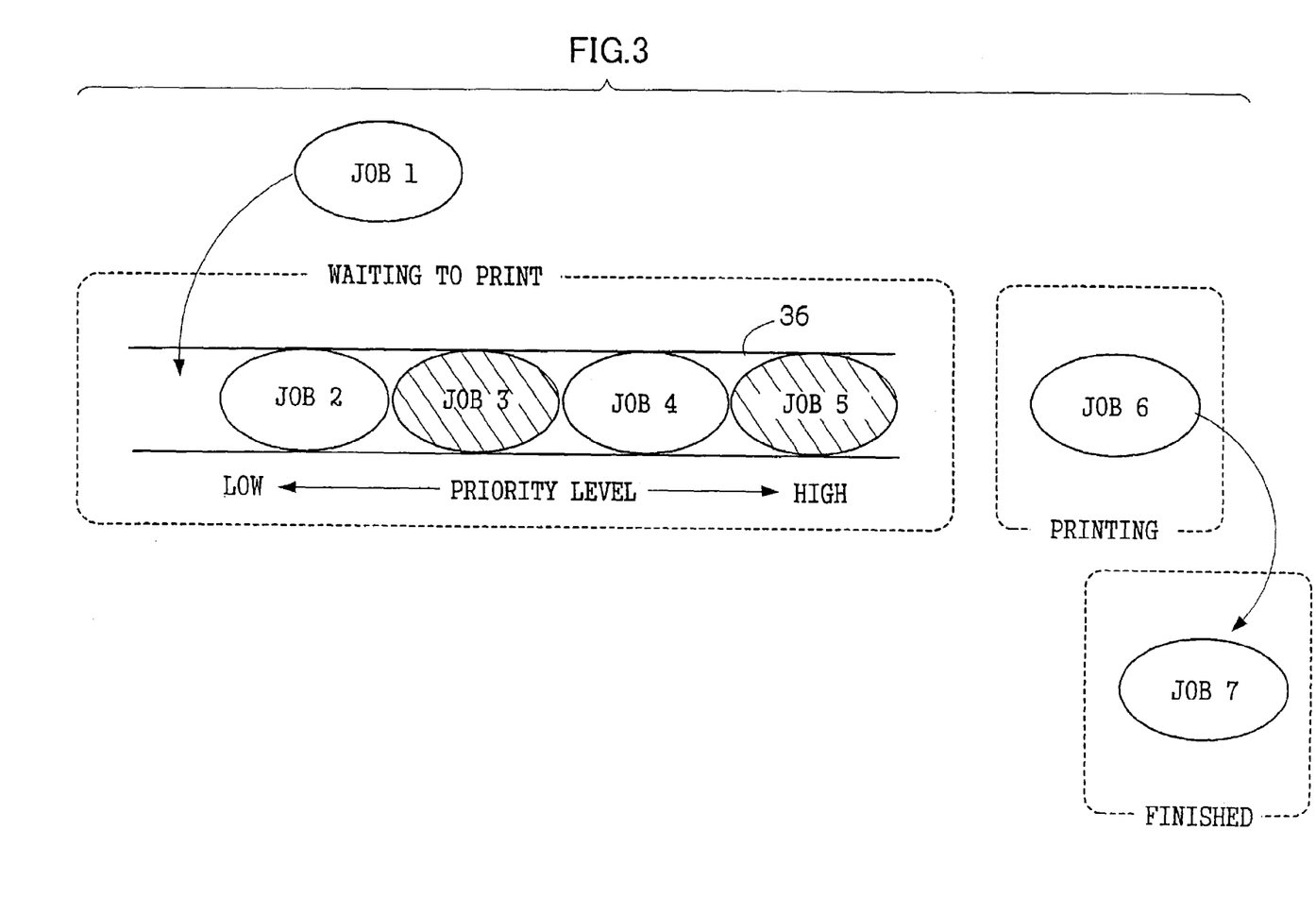
FIG. 3 is a diagram for explaining a print waiting queue.

The job control component 20 administers the above-mentioned attribute values for each job and, using this information, performs execution sequence control (scheduling processing) when a plurality of print jobs are requested at the same time. Here, the job control component 20 uses a print waiting queue 36 as shown in FIG. 3.

When a plurality of print jobs is requested, the job control component 20 arranges the jobs in the print waiting queue 36, to start from print jobs whose job priority is high. In FIG. 3, at a time when a new print job 1 is created, a job 6 that is printing, a job 7 that has finished printing, and a job 2, job 3, job 4 and job 5, which are in the "waiting to print" status because the job 6 is printing, are already present. In this case, the jobs 2, 3, 4 and 5 in the "waiting to print" status are administered by the print waiting queue 36. If the job priorities are such that job 5 is sequenced before job 4, which is before job 3, which is before job 2, then a sequence of jobs in the print waiting queue 36 is as shown in FIG. 3.

Job priorities can be specified by operation of the operation component 12 and operation component 18. A priority can be set by operation of the interrupt button mentioned above or the like. In a case in which a plurality of the image input component 22 is provided, priorities of jobs inputted from each of the image input components 22 can be decided by determining priority levels for each of the image input components 22 in advance.

In a case in which a plurality of jobs having the same job priority are arranged in the print waiting queue 36, these jobs are sequenced on a first-in first-out (FIFO) basis.

At this time, the newly created job 1 is arranged at a predetermined position in the print waiting queue 36 in accordance with the job priority specified for the job 1.

Besides jobs with the "waiting to print" status, the jobs arranged in the print waiting queue 36 include jobs with the status "waiting for supplies". Job 3 and job 5 in FIG. 3, which have the status "waiting for supplies", are represented with a shading pattern.

After a certain amount of time has passed, print processing of the "printing" job 6 is completed. Then, the job control component 20 performs scheduling processing, described later, to commence print processing of a next job.

The printing component 26 acquires image data from the image input component 22 for jobs for which scheduling processing has been performed and, in a printing sequence implemented by the scheduling processing, images are printed on paper based on the image data. The printing component 26 includes a paper tray at which paper for printing is set. There may be a plurality of paper trays which store paper of different sizes and different types, or there may be a single paper tray for storing paper. The printing component 26 is further provided with a detection component which detects the presence or absence of paper stored in the paper trays. The presence or absence of paper is detected by the detection component, and detection results are outputted to the job control component 20. The detection component may also detect the size of the stored paper.

Alternatively, a user may specify the size of the stored paper at the operation component 12, and the paper size may be detected by this specification. The paper type may also be identified by specification at the operation component 12. In a case in which the paper size and paper type are determined by the specification at the operation component 12, the job control component 20 implements identification thereof by confirmation of the values specified at the operation component 12.

Figure 4:
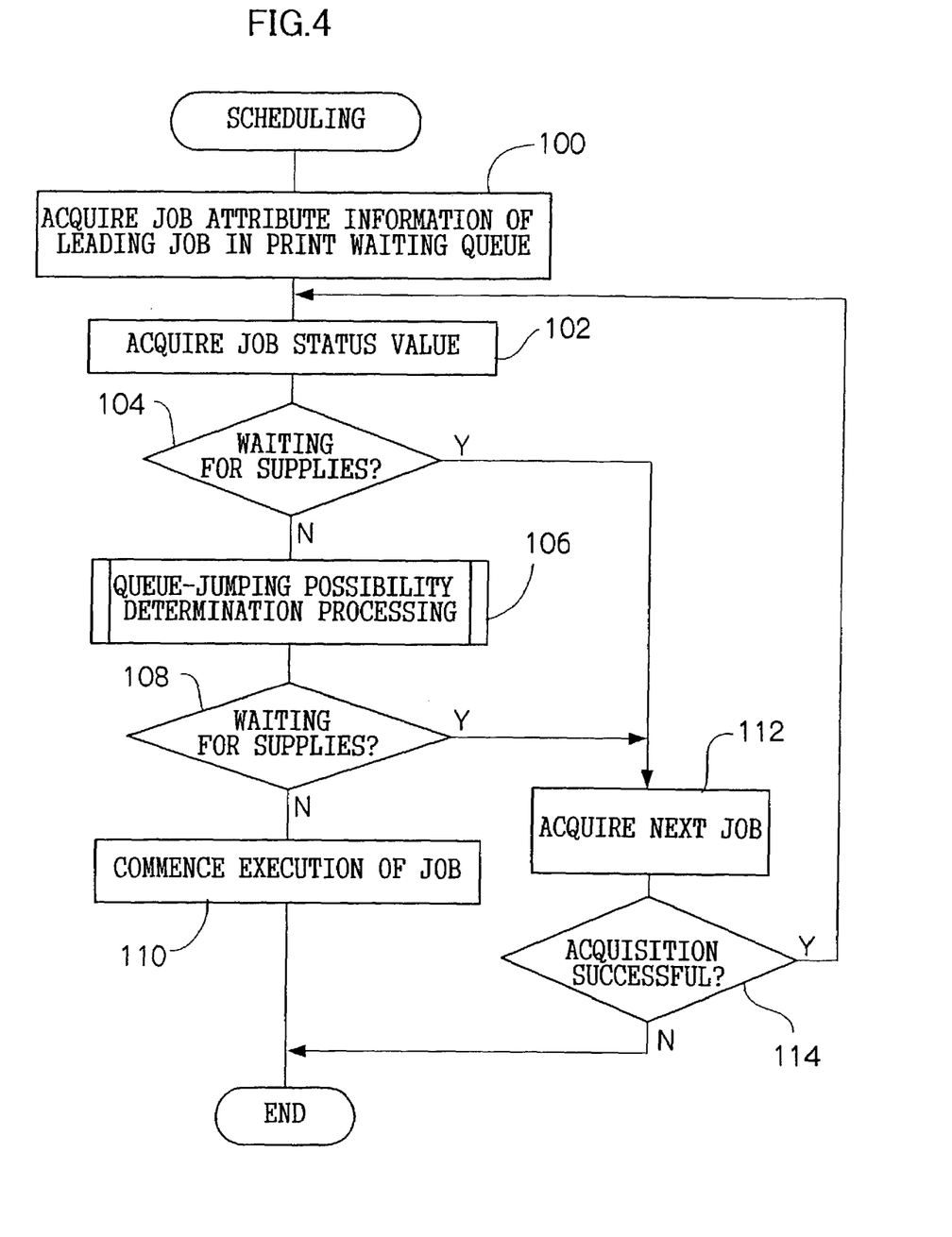
FIG. 4 is a flowchart showing image scheduling processing in the image-processing device relating to the embodiment of the present invention.

The processing scheduling mentioned above will now be described with reference to the flowchart of FIG. 4. The scheduling processing corresponds to means for specifying the precedence of the present invention.

In a step 100, the job control component 20 acquires job attribute information of the first job in line at the print waiting queue 36. That is, in the example of FIG. 3, the job control component 20 is triggered by completion of print processing of the job 6 of FIG. 3, and acquires job attribute information for the job positioned at the head of the print waiting queue 36. In the example of FIG. 3, this is job 5, and the details shown in FIG. 2 are acquired as the job attributes of job 5.

In step 102, the job status value is acquired from the job attribute information acquired in step 100. In step 104, it is determined whether the job status value is "waiting for supplies" or not. If this determination is positive, the sequence moves on to step 112, and a next job is acquired. That is, in the example of FIG. 3, in a case in which the job status value is the value representing the status "waiting for supplies", that job (for example, job 5) is determined to not be a target of scheduling processing.

Then, in step 114, it is determined whether or not this job acquisition has been successful. If this determination is positive, the sequence returns to step 102, and the processing described above is repeated again for this next job.

Meanwhile, if the determination of step 104 is negative, that is, if the status value represents a status other than "waiting for supplies", such as "waiting to print", the sequence moves on to step 106, and queue-jumping possibility determination processing is carried out as described later.

Next, in step 108, it is determined whether or not the status value of the job for which queue jumping possibility determination processing has been carried out is "waiting for supplies". If this determination is positive, that is, if the status value of the job for which queue-jumping possibility determination processing has been carried out has been changed to "waiting for supplies", then it is determined, because of the "waiting for supplies" status, that print processing could not be continued if print processing for that job was commenced, due to a lack of paper or the like. Therefore, commencement of execution of that job is abandoned, and scheduling control is performed for a next job (from steps 112 and 114).

If the determination of step 108 is negative, that is, if the status value of the job has been changed to the status "executing" as a result of the queue-jumping possibility determination processing, then it is determined that execution of that job may be commenced. The sequence moves on to step 110, and an execution commencement instruction to the printing component 26 is carried out. Thus, the job control component 20 executes these steps and repeats this processing until a job which will not be "waiting for supplies" is found among the jobs in the print waiting queue 36.

After execution of a job has commenced, in a case in which a resource such as paper or the like runs out after printing of a number of sheets, the job is halted and is not restarted until the resource is supplied. Consequently, mixing up of paper with a subsequent job can be prevented.

Now, in a case in which it is determined that execution cannot be commenced for any of the jobs in the print waiting queue 36, the status values of all the jobs in the print waiting queue 36 are "waiting for supplies". In a case in which this condition is attained, when a resource supply event, such as re-stocking of paper or the like, is detected from the printing component 26, the job control component 20 performs re-scheduling processing by a process shown in FIG. 5.

Figure 5:
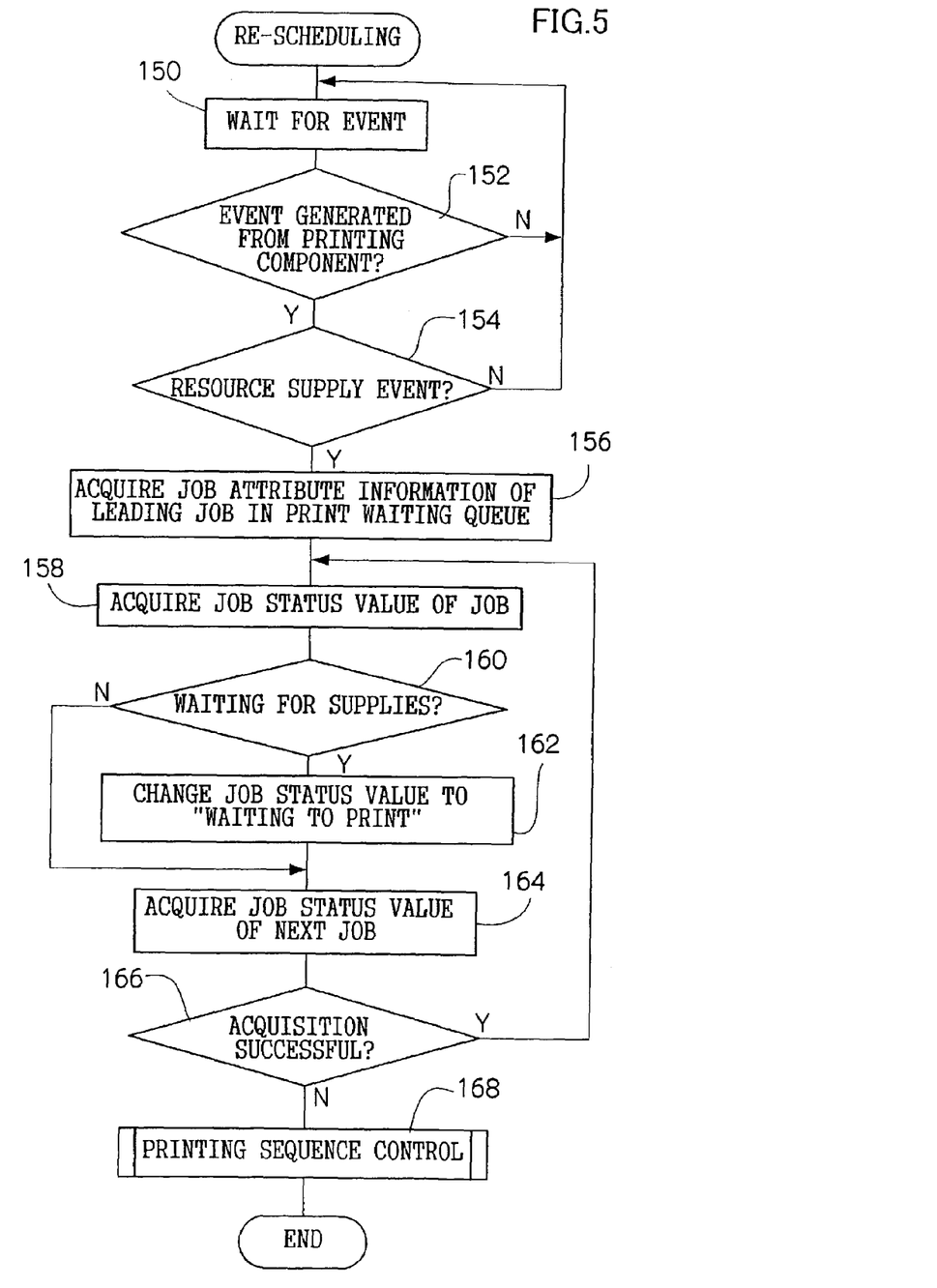
FIG. 5 is a flowchart showing re-scheduling processing in the image-processing device relating to the embodiment of the present invention.

Specifically, in a step 150, in an event-waiting condition, an event is detected. In step 152, it is determined whether or not the event that has been detected is an event from the printing component 26. If this determination is negative, the processing of step 150 and step 152 is repeated until an event from the printing component 26 occurs.

If the determination of step 152 is positive, that is, if the event has been generated by the printing component 26, then the sequence moves on to step 154. Details of the event are examined, and it is determined whether or not the event was caused by a user stocking paper at the paper tray of the printing component 26 (a resource supply event). If this determination is negative, the sequence returns to step 150, and the processing of steps 150 to 154 as described above is repeated.

However, when the determination of step 154 is positive, that is, when there has been a paper supply event, the sequence moves on to step 156, and attribute information of the leading job in the print waiting queue 36 is acquired. The sequence then moves on to step 158 and the job status value of that job is acquired from the attribute information of the job.

In step 160, it is determined whether or not the acquired job status value is "waiting for supplies". If this determination is positive, the sequence moves on to step 162. The job status value is changed to "waiting to print", and the sequence moves on to step 164. On the other hand, if the determination of step 160 is negative, that is, if the status value is different (e.g., "waiting to print"), then the sequence moves on to step 164 without any alteration.

In step 164, the job attribute information of the next job in line at the print waiting queue 36 is acquired. In step 166, it is determined whether or not this information has been acquired successfully. If this determination is positive, the sequence returns to step 158, and the above-described processing (steps 158 to 166) is repeated for all the jobs in the print waiting queue 36. When the above-described processing (steps 158 to 166) has been performed for all of the jobs, that is, when the determination of step 166 is negative, the sequence moves on to step 168, and the aforementioned scheduling processing is performed.

Figure 6:
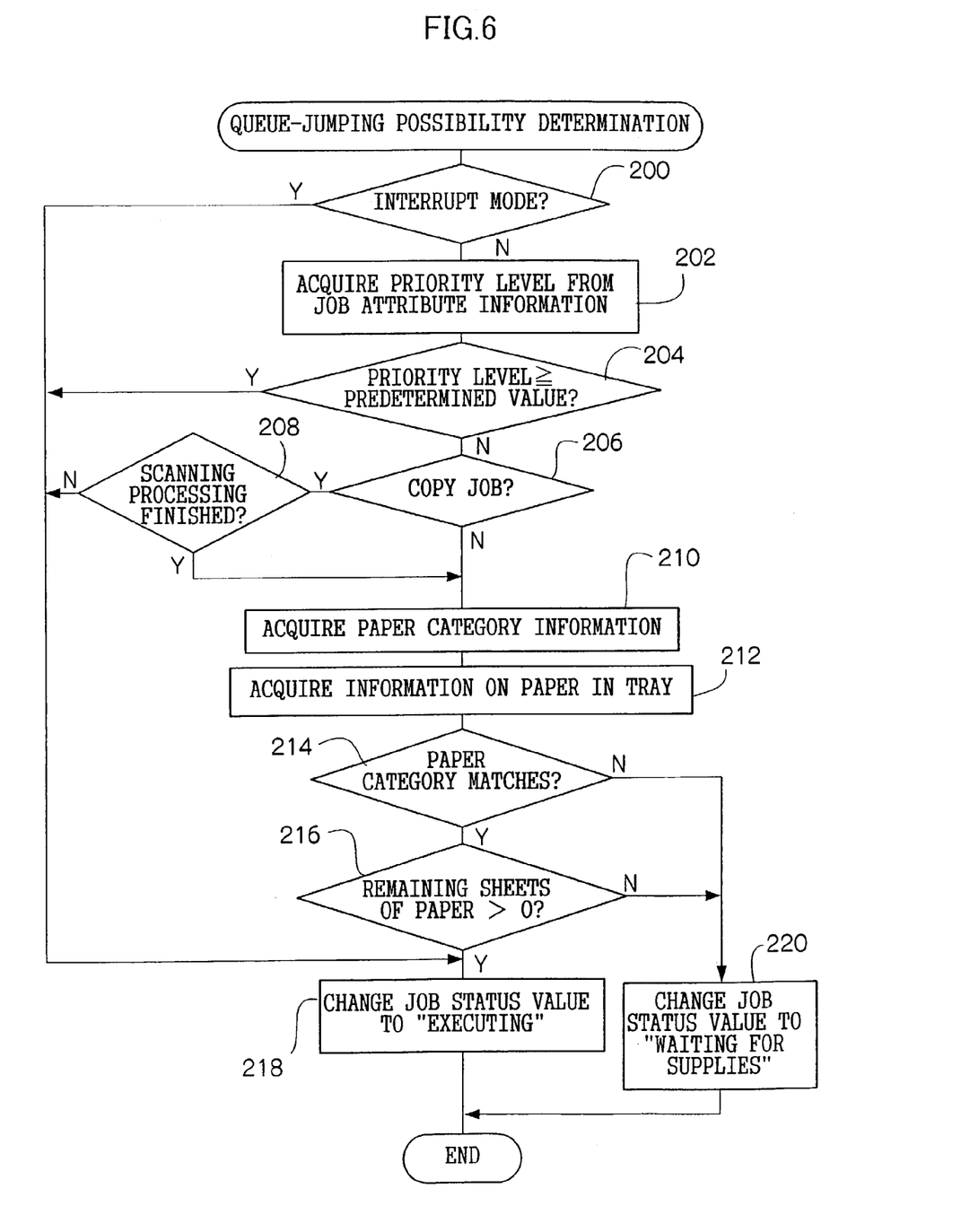
FIG. 6 is a flowchart showing queue-jumping possibility determination processing in the scheduling processing.

Next, the aforementioned queue-jumping possibility determination processing will be explained with reference to the flowchart of FIG. 6. The job control component 20 performs the processing of the steps shown in FIG. 6 on a job in the print waiting queue 36 whose status is not "waiting for supplies", during the scheduling processing shown in FIG. 4.

In step 200, the job control component 20 determines whether or not the interrupt mode is active. That is, the job control component 20 determines whether or not the interrupt mode has been specified by the interrupt button being pressed at the operation component 12. If this determination is positive, then the queue-jumping possibility determination is not performed and the sequence proceeds to step 218. In order to commence execution of the job as is, without allowing other jobs to queue-jump past that job, the job status value of the job is changed to "executing". That is, for the duration of a printing operation which is operated in the interrupt mode by the operation component 12, even if the job that is the object of queue-jumping possibility determination has a possibility of changing to "waiting for supplies", there is a high likelihood that the user will basically be in the vicinity of the image-processing device 10. Thus, there is a high likelihood that the user will promptly supply resources such as paper and the like when needed. Further, it is inferred that because the job has a degree of urgency such that interrupting other jobs is enforced, it will be problematic if this job is queue-jumped by other jobs and has to wait for print processing thereof. Consequently, in the present embodiment, as described above, execution of the job is commenced as is, without permitting queue-jumping of the job by other jobs. Accordingly, the job status value of the job is changed to "executing". Specification of the interrupt mode may also be performed by remote operation from the operation component 18.

The interrupt mode represents, for example, a mode which the user operates by pressing the interrupt button of the operation component 12 or the like during performance of copy processing, such as a copy job, to temporarily halt that copying operation and carry out another copy job. This may also include a printing operation or the like that is to be performed, during performance of a printing job, in accordance with an operation performed at the operation component 12. For example, a printing operation of a security printout, a confidential printout or the like may be initiated by inputting a secret number or the like at the operation component 12.

Meanwhile, if the determination of step 200 is negative, the sequence moves on to step 202, and a priority is acquired from the job attribute information for the job. In step 204, it is determined whether or not the priority of that job is at or above a predetermined value. That is, a job having a priority of at least a threshold value (the predetermined value) is determined to have a high degree of urgency for the user. With a job that has a high degree of urgency, in the same way as in interrupt mode, execution of the job is commenced directly, without permitting queue-jumping of that job by other jobs. Hence, the sequence moves on to step 218, and the status value of that job is changed to "executing". For example, in the example of job attributes of FIG. 2, for jobs having a priority value of "high" or above, the predetermined value may be set to "high" such that processing for queue-jumping by other jobs is not performed.

If the determination in step 204 is negative, the sequence moves on to step 206, and it is determined from the job attributes whether or not the job type information corresponds to a copy job. If this determination is positive, the sequence moves on to step 208 and, by referring to a processing status of the image input component 22 (which corresponds to the scanner control section that controls the scanner 30 in this case), it is determined whether or not scanning processing for this job has been completed. If this determination is negative, execution of this job is commenced as is, without permitting queue-jumping by other jobs. The sequence moves on to step 218 and the job status value of the job is changed to "executing". That is, when execution of this job commences, as long as scanning processing for that job (the copy job) is not yet completed, the user that set the scanning originals at the scanner 30 is highly likely to stay in the vicinity of the image-processing device 10 in order to collect the originals. Therefore, such a user is in a state to easily perform supply of resources for the job. If the print processing starts quickly, there is a possibility that the print processing may be completed at substantially the same time as completion of the scanning processing. Thus, there is an advantage in that printing output results are likely to be available for collection at the same time as collection of the originals.

On the other hand, if the determination at step 206 is negative or the determination at step 208 is positive, that is, if the job type is not a copy job, scanning processing has already completed or the like, then the sequence moves on to step 210. Paper category information, such as paper size, paper type, paper color, paper tray, paper orientation and the like, is acquired from the job attribute information. The sequence moves on to step 212, and paper information on paper currently set in the paper tray is acquired from the printing component 26 (paper size, paper type, paper color, paper orientation, number of sheets of paper remaining (which covers the presence or absence of paper) and the like).

In step 214, the information acquired in steps 210 and 212 is compared. It is determined whether or not a category of paper in the paper tray matches a category of paper that is required for the job. If this determination is positive, then the sequence moves on to step 216, and it is determined whether or not there is a number of sheets of paper remaining in the tray. If this determination is positive, the sequence moves on to step 218, it is determined that the job can commence execution, and the job status value is changed to "executing".

However, if the determination in either step 214 or step 216 is negative, then the sequence moves on to step 220. The resources required for the job and the resources that are set at the printing component 26 do not match. Accordingly, the job status value is changed to "waiting for supplies".

In a case in which the printing component 26 is provided with a plurality of paper trays, and the paper tray setting of the job attribute information is "automatic selection", even if the paper categories did not match in step 214, a check to determine whether or not another paper tray matches the requirements can be performed and repeated. If the paper tray specification is fixed (a tray number specification or the like), then in step 214 it is simply determined whether or not the type of paper set in the specified paper tray matches the requirements.

In step 214, in a case in which the paper size of the paper category matches but the paper orientation is different, it may be determined that the paper category does not match. However, if the image-processing device 10 is provided with a function for rotating the image data, then such a case can be dealt with subsequent to changing this determination.

Further, in a case in which there is a plurality of paper categories required for the job, matching determination may be performed in step 214 for all the paper categories. Alternatively, matching determination only of a paper category required for printing of a first page may be performed.

Thus, in the image-processing device 10 relating to the embodiment of the present invention, a print job that is waiting for supplies is held in the print waiting queue 36 without commencing printing processing. Until supply of resources such as paper stocking is performed, printing of that job does not commence and other print jobs, which are printable, move ahead in the queue. That is, before a print job is executed, it is determined in advance whether or not resources required for the print job have been supplied. If these resources have not been supplied, a next job is given precedence and performed. Therefore, situations in which other printing processes cannot be performed when resources are not supplied are eliminated, and both productivity of the whole device can be improved and usefulness thereof to the users can be improved.

Moreover, in a case in which a plurality of types of paper or the like are mixed in one job, it is determined in advance whether or not all required papers have been supplied as resources. Therefore, situations in which printing stops in the middle of print processing, due to a lack of one of the types of paper, are eliminated. Thus, a situation in which a subsequent job is commenced and output of the subsequent job is mixed up with output of the stopped job is eliminated.

In a case in which a resource runs out in the middle of printing, even though the resource had been supplied before the commencement of printing, the printing processing is stopped in the middle of printing. However, if subsequent jobs are not given precedence and performed when a job is stopped in this manner, mixing up of output of the stopped job and output of a subsequent job can be avoided.

Yet further, in the image-processing device 10 relating to the embodiment of the present invention, in the case of a job for which there is a high possibility that a user is in the vicinity of the device, and that the user will perform a resource supply operation such as paper stocking or the like promptly, print processing thereof can be resumed (after the supply of resources) even though that job was known to be "waiting for supplies". Therefore, a situation in which a print job with a high degree of urgency unexpectedly becomes unable to commence printing can be avoided. Thus, usefulness to users can be improved without a reduction in the processing efficiency of the overall device.

For the embodiment described above, resources have been explained principally in terms of paper. However, the present invention is not limited thus, and the present invention can be applied to resources such as, for example, toner and the like.

According to the present invention as explained above, before a printing process is performed, a print job is inputted and detection results of storage information of resources, including the presence or absence of the resources, are obtained. In a case in which, based on the inputted print job and the detection results, a corresponding resource is not stored, the printing process is inhibited. Therefore, when a resource is not stored in a storage component and a printing process cannot be performed, it is possible for another printing process to be executed. A situation in which the other printing process cannot be performed until that resource has been supplied is eliminated, and thus there is an effect in that both the productivity of the overall device is improved and usefulness to users is improved.

Furthermore, if, during a printing process, a resource for printing image data is not stored, the printing process is stopped. If other printing processes are not given priority at this time, then there is an effect that mixing up of printed results of the printing process that has been stopped and printed results of a next printing process can be prevented.

What is claimed is:

1. An image-processing device comprising:
   an inputting unit that inputs a first print job and a second print job, the second print job to be processed after the first print job is processed;
   an acquiring unit that acquires resource information including presence or absence of a required consumable resource for the first print job;
   a printing unit that processes the first and second print jobs, the printing unit processing the first print job with the required consumable resource; and a controlling unit that permits processing the second print job before the first print job is processed when a job priority of the first print job is lower than a predetermined priority level and the acquired resource information indicates the absence of the required consumable resource, wherein the controlling unit also permits processing the first print job before the second print job is processed when the job priority of the first print job is lower than the predetermined priority level and the acquired resource information indicates the presence of the required consumable resource, and permits processing the first print job before the second print job is processed when the job priority of the first print job is higher than the predetermined priority level even in the absence of a required consumable resource for the first print job.

2. The image-processing device according to claim 1, further comprising a storing unit that stores the required consumable resource, wherein the acquiring unit includes a detecting unit that detects whether or not the required consumable resource is stored in the storing unit.

3. The image-processing device according to claim 1, wherein:

the required consumable resource is a printing medium; and the controlling unit permits processing the second print job before the first print job is processed when the acquired resource information indicates the absence of the printing medium.

4. The image-processing device according to claim 1, further comprising a priority level setting unit that is capable of setting different priority levels to the first and second print jobs, and sets the job priority.

5. The image-processing device according to claim 1, further comprising an operating unit that generates the first print job based on a request from a user, and sets the job priority higher than the predetermined priority level to the first print job.

6. The image-processing device according to claim 1, further comprising an interrupting unit that interrupts a processing of a print job to be processed in the printing unit, and sets the job priority higher than the predetermined priority level to the first print job.

7. The image-processing device according to claim 1, further comprising an image-reading unit that reads an image of a medium to generate the first print job, and sets the job priority higher than the predetermined priority level to the first print job.

8. An image-processing method comprising:

receiving a first print job and a second print job, the second print job to be processed after the first print job is processed;

acquiring resource information including presence or absence of a required consumable resource for the first print job;

permitting a printing unit to process the second print job before the first print job is processed when a job priority of the first print job is lower than a predetermined priority level and the acquired resource information indicates the absence of the required consumable resource;

permitting the printing unit to process the first print job before the second print job is processed when the job priority of the first print job is lower than the predetermined priority level and the acquired resource information indicates the presence of the required consumable resource; and permitting the printing unit to process the first print job before the second print job is processed when the job priority of the first print job is higher than the predetermined priority level, even in the absence of a required consumable resource for the first print job.

* * * * *